United States Patent
Ohtomo et al.

[11] Patent Number: 5,898,489
[45] Date of Patent: Apr. 27, 1999

[54] LASER IRRADIATION LIGHT DETECTING DEVICE

[75] Inventors: Fumio Ohtomo; Hiroshi Koizumi; Masayuki Momiuchi; Masahiro Ohishi; Toshikazu Adegawa, all of Tokyo, Japan

[73] Assignee: Kabushiki Kaisha Topcon, Tokyo, Japan

[21] Appl. No.: 08/848,820

[22] Filed: May 1, 1997

[30] Foreign Application Priority Data

May 2, 1996 [JP] Japan ................................ 8-135879

[51] Int. Cl.[6] ................................................ G01B 11/26
[52] U.S. Cl. ................................................ 356/138
[58] Field of Search .......................... 356/28, 28.5, 349, 356/358, 360, 138

[56] References Cited

U.S. PATENT DOCUMENTS 4,413,905 11/1983 Holzapfel ................................ 356/5
5,191,588 3/1993 Dacquay ................................ 372/22
5,317,447 5/1994 Baird et al. ............................. 359/328
5,489,984 2/1996 Hariharan et al. ....................... 356/360

Primary Examiner—Robert Kim
Assistant Examiner—Zandra V. Smith
Attorney, Agent, or Firm—Baker & Botts, L.L.P.

[57] ABSTRACT

The present invention relates particularly to a laser irradiation light detecting device having detecting means for receiving a reflected light pencil of a laser light pencil applied from a laser irradiating device provided with a non-linear optical medium for generating a second harmonic. A laser light source pumps an optical resonator and a pulse driving means drives the laser light source. An irradiating means applies a pencil of pulse laser light produced from a laser oscillating device to a target device. A detecting means detects a light pencil reflected from the target device. An arithmetic processing means executes predetermined operations, based on the signal detected by the detecting means. The detecting means detects the reflected light pencil of the pulse laser light pencil in synchronism with a period T of a driving pulse of the pulse driving means.

5 Claims, 21 Drawing Sheets

FIG. 2
| FIG.2(A) |
|----------|
| FIG.2(B) |
FIG.2(A)
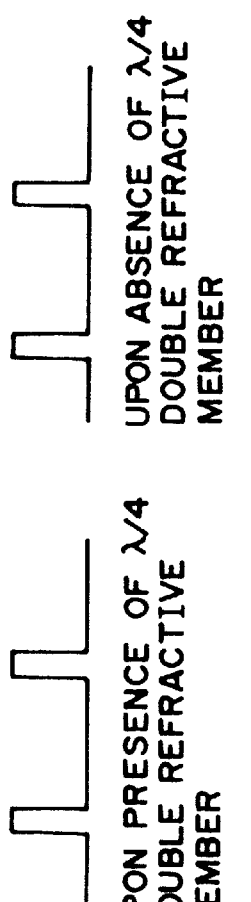
UPON PRESENCE OF λ/4 DOUBLE REFRACTIVE MEMBER
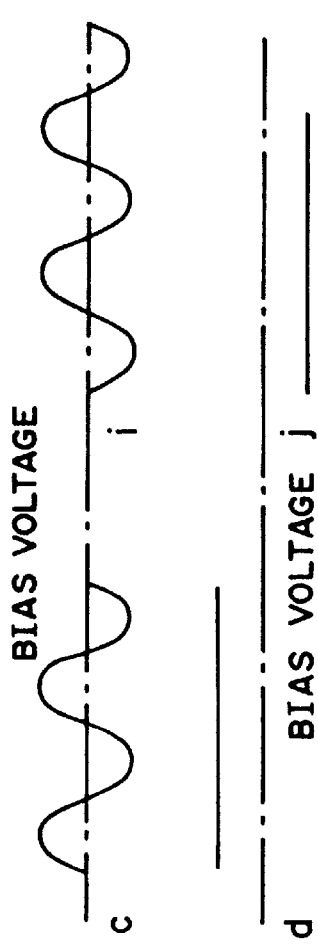
UPON ABSENCE OF λ/4 DOUBLE REFRACTIVE MEMBER
FIRST PHOTOELECTRIC CONVERTER 134    a    g
SECOND PHOTOELECTRIC CONVERTER 135    b    h
DIFFERENTIAL AMPLIFIER 1367    c    i
BIAS VOLTAGE            BIAS VOLTAGE
SYNCHRONISM DETECTOR 1368A    d    j

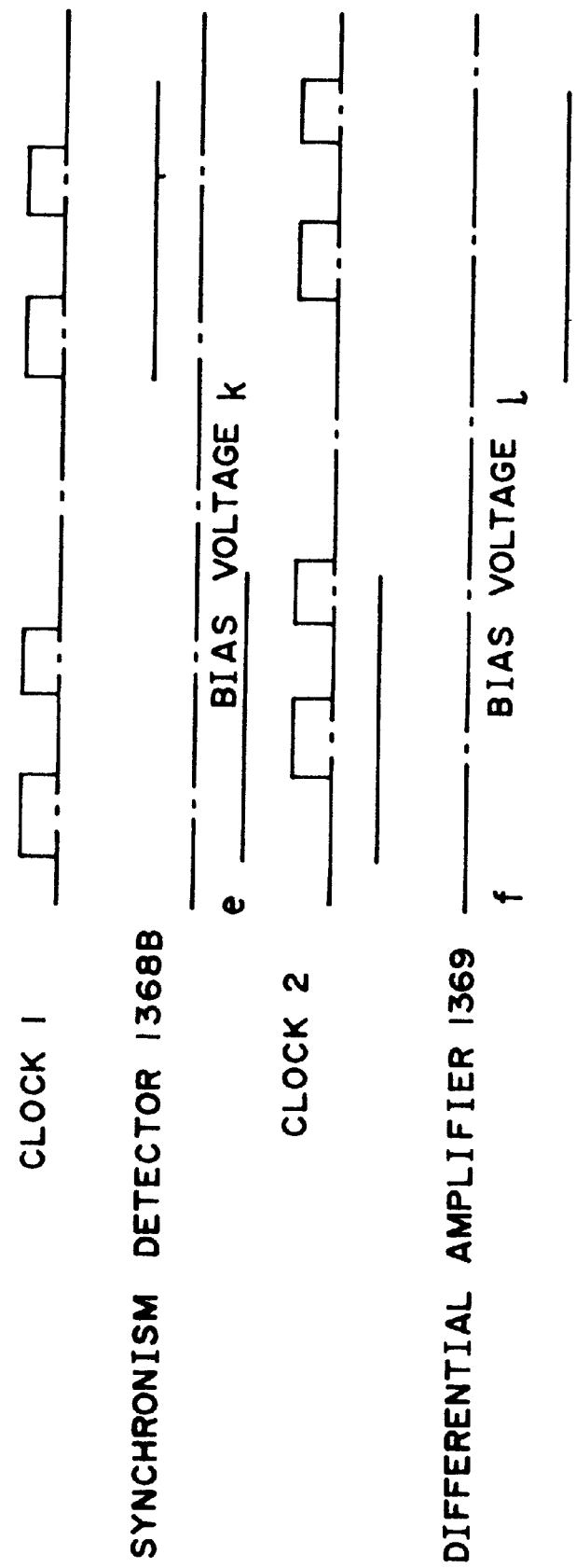

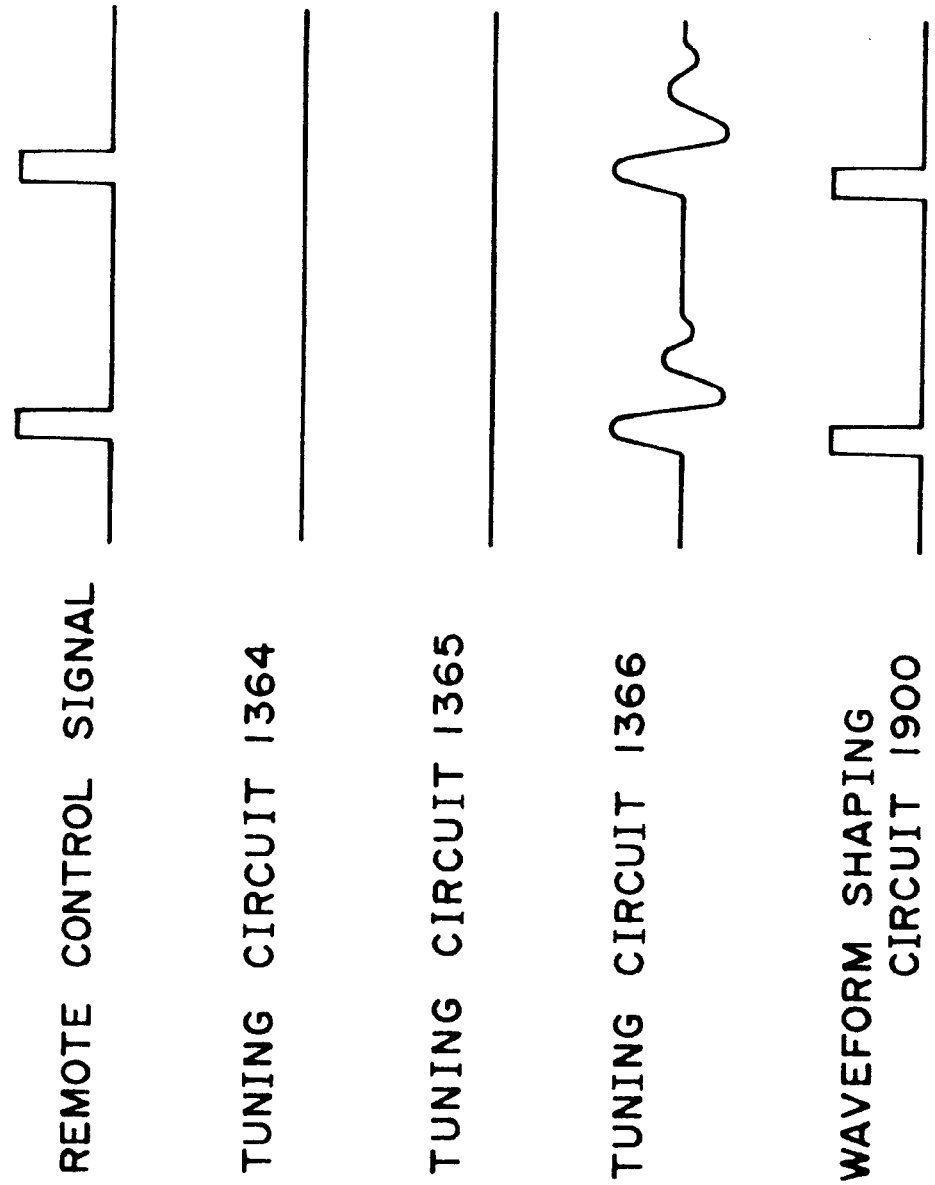

LASER LIGHT PENCIL
SCANNING DIRECTION

OUTPUT SIGNAL OF
DIFFERENTIAL AMPLIFIER time    ⟶ t

FIG. 21(a)
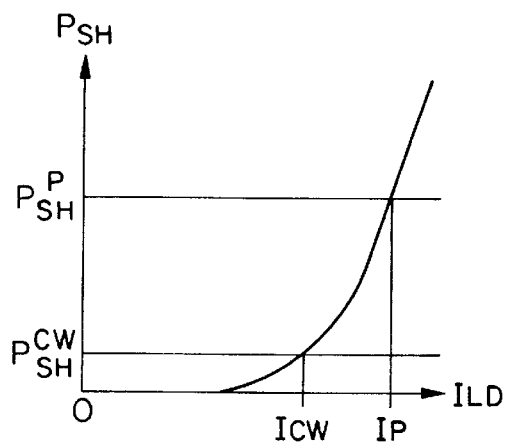
FIG. 21(b)
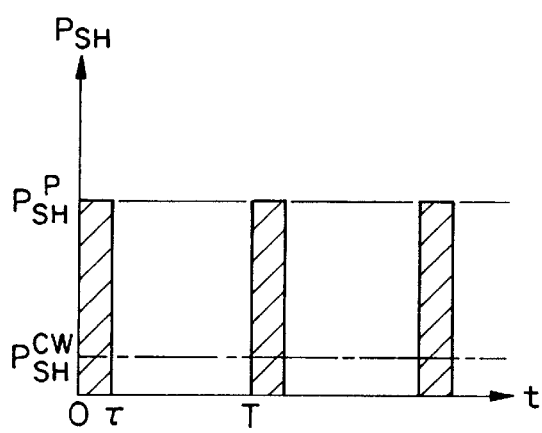
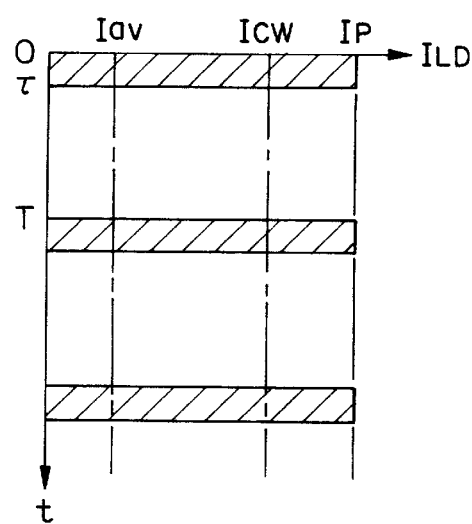
FIG. 21(c)

LASER IRRADIATION LIGHT DETECTING DEVICE

BACKGROUND OF THE INVENTION

The present invention relates to a laser irradiation light detecting device, and particularly to a laser irradiation light detecting device having detecting means for receiving a reflected light pencil of a laser light pencil applied from a laser irradiating device provided with a non-linear optical medium for generating a second harmonic.

A device intended for use outdoors upon civil engineering construction and surveying work or the like, particularly, a device for providing the reference for a distance location has heretofore been in existence. A visible-light laser irradiating device has been used as this type of device. With technical advances in semiconductor laser emission, a semiconductor laser has been widely used in place of a laser using a gas such as a helium-neon gas or the like. In particular, a battery-operable laser irradiating device for applying red visible light has been used in general. Further, a device has come into being which modulates a laser light pencil, irradiates a target disposed at a distant location with it and detects its reflected light pencil to thereby control the irradiating direction of a laser beam.

However, the conventional visible-light laser irradiating device is accompanied by a problem that constraints and limitations are imposed on the output applied from the laser irradiating device from the viewpoint of the ability of the semiconductor laser and safety's sake and particularly when it is used at a bright location, it is hard to visually recognize red visible laser beam.

With the problem on its visibility in view, an attempt has been made to use the green greater in human relative visibility than the red. A solid green laser using a second harmonic has become a focus of attention. Although a visible-light laser irradiating device wherein this type of solid green laser has been incorporated into a laser oscillating device, has been developed, the solid green laser itself provides more power consumption and hence the visible-light laser irradiating device was unfit for battery driving.

The device which scans and detects a reflected laser light carries out a frequency modulation and a synchronism detection so as to distinguish from noise, however, for solid green laser direct modulation becomes hard at a modulation frequency, e.g., 100 KHz. Therefore, a serious problem arises in that the device must be constructed on a large scale when the device is used in combination with an externally-provided modulation device.

SUMMARY OF THE INVENTION

According to one aspect of the present invention, there is provided a laser irradiation light detecting device comprising:

a laser oscillating device comprising,
an optical resonator composed of at least a laser crystal and an output mirror and having a non-linear optical medium inserted therein for generating a second harmonic,
a laser light source for pumping the optical resonator and
pulse driving means for driving the laser light source;
means for irradiating a target device with a pencil of pulse laser light produced from the laser oscillating device;
means for detecting a light pencil reflected from the target device; and
arithmetic processing means for executing predetermined operations, based on a signal detected by the detecting means,
the detecting means detecting a reflected light pencil of said pulse laser light pencil in synchronism with a period T of a driving pulse of the pulse driving means.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The present invention will now be described with reference to the accompanying drawings wherein:

FIGS. 2a and 2b is a view for explaining the operation of the reflected light detection circuit of the laser irradiating device shown in FIG. 1;

FIG. 3 is a view for explaining a remote-control lightwave signal employed in the present embodiment;

FIG. 17($b$) is a view typically illustrating a gain switch and shows the relationship between the time and the intensity of light;

FIG. 17($c$) is a view typically depicting a gain switch and shows the relationship between the time and an inverted population;

FIGS. 19(b)–19(f) are views for describing the relationship in which the period T of the continuous pulse supplied to the semiconductor laser satisfies the condition that $\tau_{FL}>T-\tau$;

FIG. 21 is view showing the comparison between continuous driving of a laser oscillating device and pulse driving thereof according to the present invention.

DETAILED DESCRIPTION OF THE INVENTION

[Reflected Light Detection Circuit]

Figure 1:
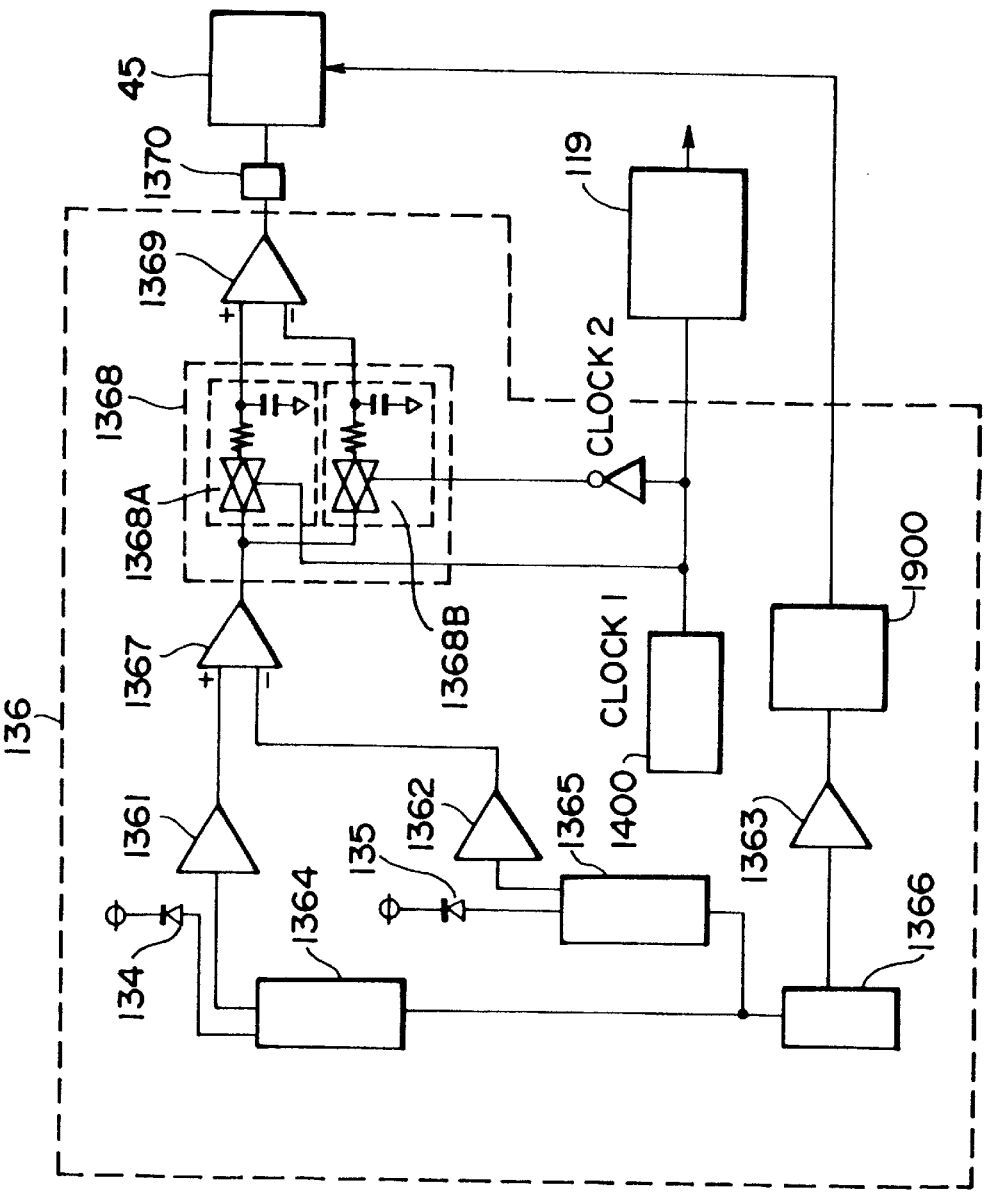
FIG. 1 is a view showing an electrical configuration of a reflected light detection circuit of a laser irradiating device according to an embodiment of the present invention.

A reflected light detection circuit 136 will be described with reference to FIG. 1. The reflected light detection circuit 136 comprises a first amplifier 1361, a second amplifier 1362, a third amplifier 1363, a first tuning circuit 1364, a second tuning circuit 1365, a third tuning circuit 1366, a first differential amplifier 1367, a synchronism detector unit 1368, a second differential amplifier 1369, a level determinator 1370, an oscillator 1400, and a waveform shaping circuit 1900.

The first tuning circuit 1364 is identical in tuning frequency to the second tuning circuit 1365, whereas it is different in tuning frequency from the third tuning circuit 1366.

The first amplifier 1361 amplifies an output signal of a first photoelectric converter 134, which is inputted thereto through the first tuning circuit 1364. The second amplifier 1362 amplifies an output signal of a second photoelectric converter 135, which is inputted thereto through the second tuning circuit 1365.

A laser beam reflected from a target 2000 to be described later is received by the first photoelectric converter 134 and the second photoelectric converter 135. The received individual laser beams are amplified by the first amplifier 1361 and the second amplifier 1362, followed by supply to the first differential amplifier 1367. The first differential amplifier 1367 is configured so as to obtain the difference between the signals outputted from the first amplifier 1361 and the second amplifier 1362.

The synchronism detector unit 1368 comprises a first synchronism detector 1368A and a second synchronism detector 1368B and generates positive and negative voltages, based on a signal outputted from the first differential amplifier 1367 in response to a clock 1 generated from the oscillator 1400 and a clock 2 obtained by inverting the clock 1.

The second differential amplifier 1369 obtains a signal indicative of the difference between a signal outputted from the first synchronism detector 1368A of the synchronism detector unit 1368 and a signal outputted from the second synchronism detector 1368B thereof and also obtains a positive or negative voltage with respect to a bias signal. The level of the signal outputted from the second differential amplifier 1369 is determined by the level determinator 1370. Thereafter, the level-determined signal is inputted to a controller 45.

The oscillator 1400 supplies the clock signals necessary for synchronous detection to the synchronism detector unit 1368 and sends them to a laser driver 119. Further, the oscillator 1400 also supplies a clock signal for pulse-driving a laser light source (pumping light source) 100 of a laser oscillating device 1000 to be described later.

The first photoelectric converter 134 and the second photoelectric converter 135 of the reflected light detection circuit 136 can be used not only for the detection of reflected light but also for the detection of a lightwave signal produced from a remote controller.

The lightwave signal produced from the remote controller is received by the first photoelectric converter 134 and the second photoelectric converter 135. The output signals of the first and second photoelectric converters 134 and 135 are added together by the third tuning circuit 1366. The result of addition by the third tuning circuit 1366 is amplified by the third amplifier 1363, after which it is inputted to the controller 45.

Although described in an application to be explained later, the polarization of a reflected light is changed according to the position where a polarized laser beam emitted from a laser irradiating device 20000. The reflected light is selected according to the polarizing direction and is launched into the first photoelectric converter 134 and the second photoelectric converter 135 to thereby detect the ratio between the two reflected light, whereby the central position of the target 2000 can be determined. States of signals produced from the first and second photoelectric converters 134 and 135 at the time that the quantity of light launched into the first photoelectric converter 134 is greater than the quantity of light launched into the second photoelectric converter 135, will be shown in FIGS. 2(a) and 2(b).

The signals produced from the first and second photoelectric converters 134 and 135 are respectively amplified by the first amplifier 1361 and the second amplifier 1362 to which they have been inputted through the first tuning circuit 1364 and the second tuning circuit 1365. Thereafter, the first differential amplifier 1367 takes the difference between the amplified signals. A signal outputted from the first differential amplifier 1367 is represented as shown in FIG. 2(c).

The tuning frequencies of the first and second tuning circuits 1364 and 1365 are set so as to coincide with the repetitive or cyclic frequency of a pulse signal for pulse-driving the laser light source 100 of the laser oscillating device 1000.

If the first synchronism detector 1368A detects the signal outputted from the first differential amplifier 1367 in synchronism with the clock 1 generated from the oscillator 1400, then the first synchronism detector 1368A generates a voltage positive to a bias voltage as shown in FIG. 2(d). Further, if the second synchronism detector 1368B detects the signal outputted from the first differential amplifier 1367 in synchronism with the clock 2 generated from the oscillator 1400, then the second synchronism detector 1368B generates a voltage negative to the bias voltage shown in FIG. 2(e).

If the second differential amplifier 1369 makes the difference (d–e) between the output signals of the first and second synchronism detectors 1368A and 1368B, then the second differential amplifier 1369 can obtain a voltage positive to the bias voltage as shown in FIG. 2(*f*).

An example in which the reflected light received by the second photoelectric converter 135 is high in level, is shown on the right side of FIG. 2. In the same process as described above, the output signal of the second differential amplifier 1369 assumes a value negative to a bias voltage.

The level determinator 1370 detects whether the output signal of the second differential amplifier 1369 be nearly zero or positive or negative, and transfers the result of detection to the controller 45. Incidentally, the output signal of the second differential amplifier 1369 can provide noise reduction resulting from an average effect through the synchronous detection.

The lightwave signal used for remote control is driven in the form of a pulse as shown in FIG. 3. The width of the pulse is set so as not to influence the first tuning circuit 1364 and the second tuning circuit 1365. Namely, the time corresponding to twice the time width of the pulse for the remote control is set so as not to coincide with the tuning frequencies of the first and second tuning circuits 1364 and 1365.

Therefore, no output signals are produced from the first tuning circuit 1364 and the second tuning circuit 1365. However, since the third tuning circuit 1366 is tuned to the frequency in which the time corresponding to twice the pulse width of the remote controller is set as a period or cycle, an attenuated oscillation waveform appears from the third tuning circuit 1366 when the lightwave signal for the remote control is inputted. If the waveform shaping circuit 1900 waveform-shapes the attenuated oscillation waveform inputted thereto from the third tuning circuit 1366 through the third amplifier 1363, then the waveform shaping circuit 1900 can generate a control signal and control the controller 45 based on the control signal.

A modification of the reflected light detection circuit 136 will next be described. The present modification shows an example in which the reflected light detection circuit 136 is digitally activated. The above-described embodiment utilizes the tuning circuits and is configured so as to detect the fundamental-wave component of the cyclic frequency of the pulse laser beam, whereas the present modification integrates or adds up digitized values in synchronism with a pulse waveform.

Figure 4:
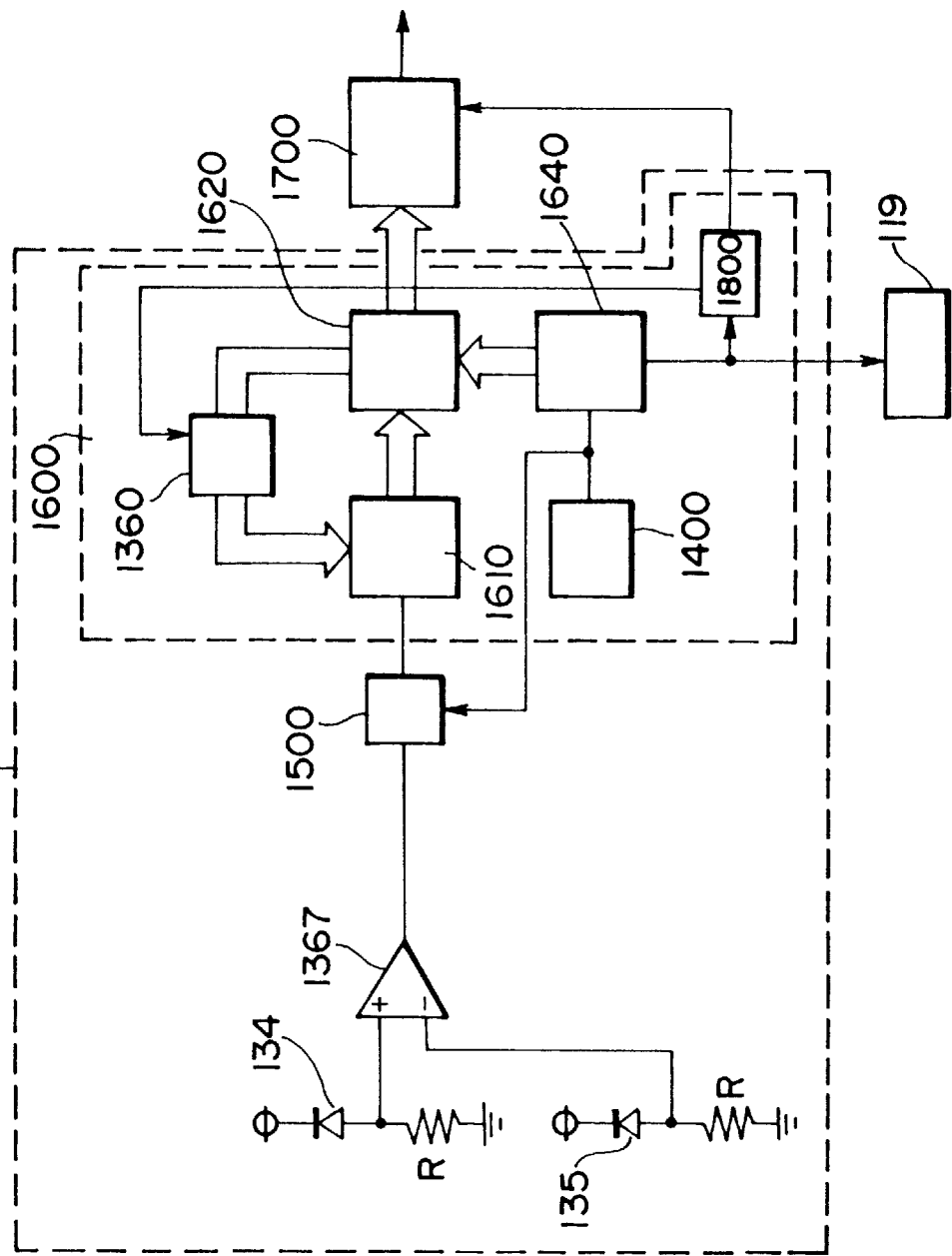
FIG. 4 is a view illustrating a modification of the reflected light detection circuit.

A reflected light detection circuit 136A showing the present modification will be described in detail with reference to FIG. 4.

The reflected light detection circuit 136A comprises a first photoelectric converter 134, a second photoelectric converter 135, a first differential amplifier 1367, an oscillator 1400, an A/D converter 1500, an integrating circuit 1600 and a comparator 1700.

The integrating circuit 1600 comprises an adder 1610, a random-access memory (RAM) 1620, a reset circuit 1630 and an address counter 1640.

In the reflected light detection circuit 136A similarly to the aforementioned reflected light detection circuit 136, the first differential amplifier 1367 takes the difference between signals outputted from the first and second photoelectric converters 134 and 135. The output signal of the first differential amplifier 1367 is synchronized with the period or cycle of a pulse for driving a laser light source 100 of a laser oscillating device 1000. Further, the output signal thereof is converted into digital form in a cycle shorter than its cycle by the A/D converter 1500, followed by delivery to the integrating circuit 1600.

The adder 1610 is supplied with data stored at respective addresses of the random-access memory (RAM) 1620 together with the data converted into digital form by the A/D converter 1500 through the reset circuit 1630. The random-access memory (RAM) 1620 has memories for dividing a cycle T into plural form (e.g., 100) and storing them therein.

The address counter 1640 sequentially updates and specifies the addresses in the random-access memory (RAM) 1620 based on a reference clock generated from the oscillator 1400. Incidentally, the values of the data stored in the memories specified by the individual addresses in the random-access memory (RAM) 1620 will be regarded as having been initialized upon starting the integration.

The adder 1610 adds the data stored at each address in the random-access memory (RAM) 1620 and the data converted into digital form by the A/D converter 1500. Further, the adder 1610 writes the added data into a memory specified by its corresponding address for each address. Namely, the adder 1610 adds ⌈data⌋ stored in a memory specified by the first address and the output data converted into digital form by the A/D converter 1500 to thereby perform re-write processing on its memory so that the addresses are successively updated and repeatedly specified. Thus, the data are written into the memories specified by the 100 addresses so that the first integration is performed.

When the 100 addresses have been specified, the address counter 1640 specifies the initial address in the random-access memory (RAM) 1620 again from the beginning.

When a light-emitting portion is put in sync (phase) with a light-receiving portion, the second integrating start time coincides with the initial address. Further, the second and later data are successively added to the random-access memory (RAM) 1620 in synchronism with a pulse waveform of reflected light. Incidentally, the number of times the data are added together, is controlled by an integrating counter 1800.

When a predetermined number of integrations are completed, the integrating counter 1800 allows the comparator 1700 to transfer integrated data from the random-access memory (RAM) 1620 and causes the reset circuit 1630 to prohibit the input of data from the random-access memory (RAM) 1620 to the adder 1610.

Thus, the data stored in the memories specified by the individual addresses in the random-access memory (RAM) 1620 are initialized simultaneously with the output of the integrated data to the comparator 1700 so that the next integration is performed.

Under this operation, the integrating circuit 1600 samples the signal produced from the A/D converter 1500, which has been converted into digital form, in synchronism with the reference clock generated from the oscillator 1400 plural times at predetermined time intervals within one cycle T of the repetitive pulse light, and accumulates or integrates sampled values obtained every sampling turns within one cycle T over a plurality of cycles. It is thus possible to reduce noise owing to the average effect.

Principle of ⌈Laser-Diode Excited Laser Beam oscillating Device⌋

Figure 15:
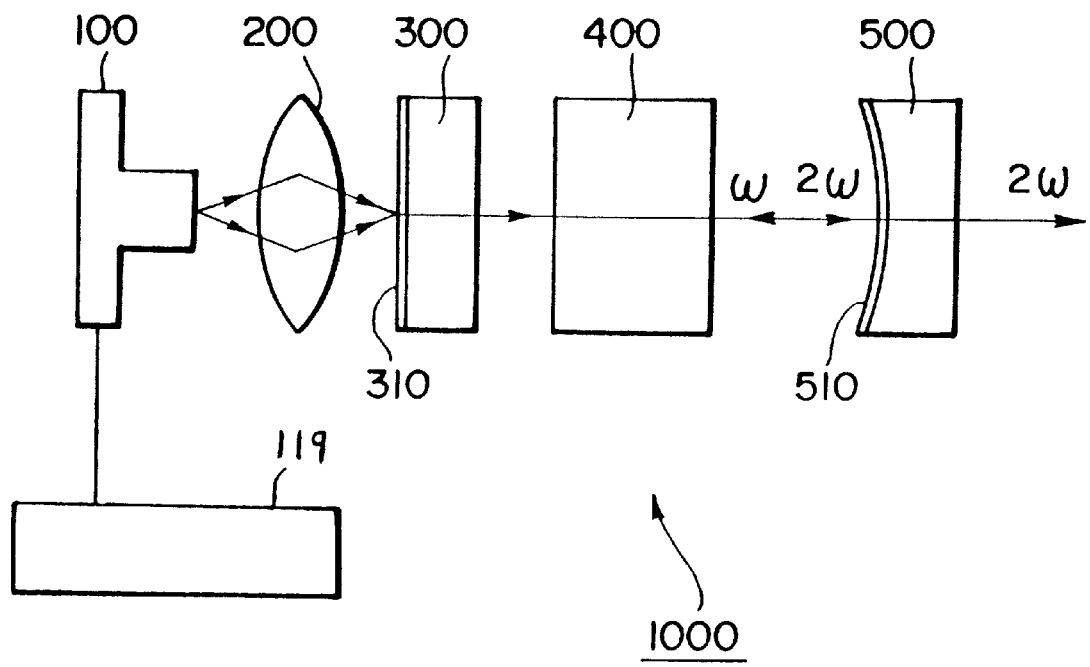
FIG. 15 is a view depicting a configuration of a laser oscillating device employed in the embodiment of the present invention.

FIG. 15 shows a laser oscillating device 1000 employed in the present embodiment. The laser oscillating device 1000 comprises a laser light source 100, a condenser lens 200, a laser crystal 300, a non-linear optical medium 400, an output mirror 500 and a laser driver 119.

The laser light source 100 is used to generate a laser beam. In the present embodiment, a semiconductor laser is used as the laser light source 100. In the present embodiment, the laser light source 100 functions as a pumping light generator for generating an optical fundamental wave.

The output mirror 500 is configured so as to be opposed to the laser crystal 300 with a first dielectric reflecting film 310 formed thereon. The laser crystal 300 side of the output mirror 500 is processed into a shape of a concave spherical mirror having a suitable diameter so that a second dielectric reflecting film 510 is formed on the output mirror 500. The second dielectric reflecting film 510 provides high reflection to an oscillation wavelength of the laser crystal 300 and high permeability to SHG (SECOND HARMONIC GENERATION).

Thus, when a light flux or pencil produced from the laser light source 100 is pumped into the laser crystal 300 through the condenser lens 200 using the first dielectric reflecting film 310 of the laser crystal 300 and the output mirror 500 in combination, the light travels between the first dielectric reflecting film 310 of the laser crystal 300 and the output mirror 500 so that the light can be trapped therebetween for a long time. Therefore, the light, can be resonated and amplified.

In the present embodiment, the non-linear optical medium 400 is inserted into an optical resonator composed of the first dielectric reflecting film 310 of the laser crystal 300 and the output mirror 500.

For example, KTP (KTiOPO$_4$: potassium titanyl phosphate), BBO (β-BaB$_2$O$_4$: β-type lithium borate), LBO (LiB$_3$O$_5$: Lithium Triborate) or the like is used for the non-linear optical medium 400. The non-linear optical medium 400 is principally converted to 1064 nm to 532 nm.

Further, KNbO$_3$ (potassium niobate) or the like is also used for the non-linear optical medium 400. In this case, the non-linear optical medium 400 is principally converted to 946 nm to 473 nm.

In FIG. 15, ω indicates an angular frequency of an optical fundamental wave, and 2ω indicates the second harmonic generation (SHG).

The driving of the laser oscillating device 1000 will next be discussed slightly.

Figure 16:
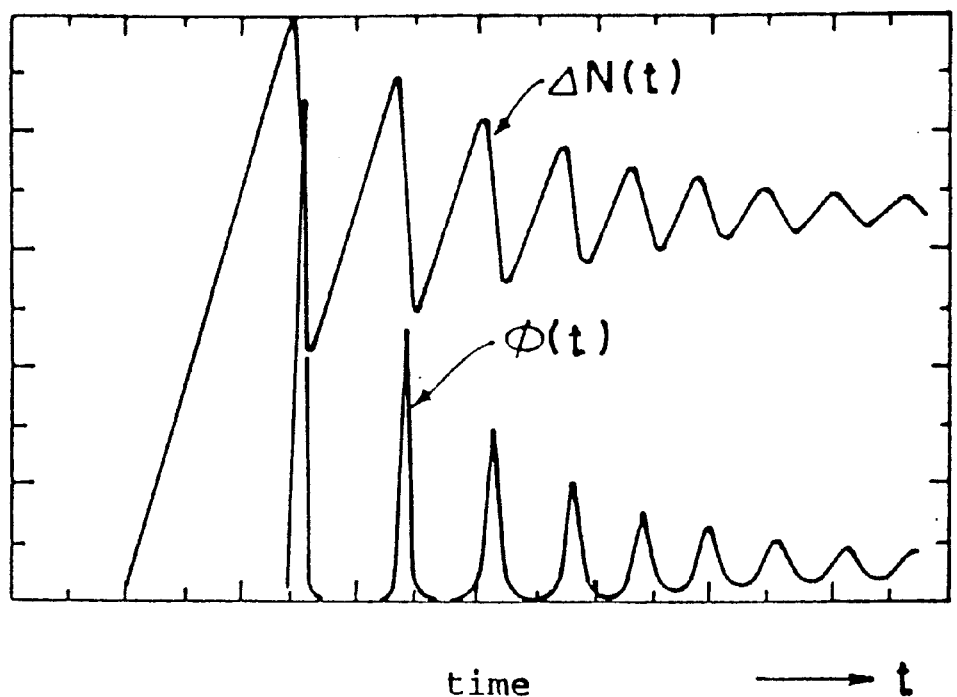
FIG. 16 is a view showing the relationship between an inverted population and the intensity of light at the time of relaxation oscillations of a semiconductor laser.

FIG. 16 shows the relationship between an inverted population and light intensity at relaxation oscillations of a generally-used laser light source. A delta N(t) shown in FIG. 16 indicates the inverted population (gain), φ(t) indicates the intensity of light, and the abscissa indicates the elapse of time.

It can be understood from FIG. 16 that when the inverted population reaches the maximum, the initial spike (i.e., first pulse) rises so as to produce the maximum light intensity.

Figure 17:
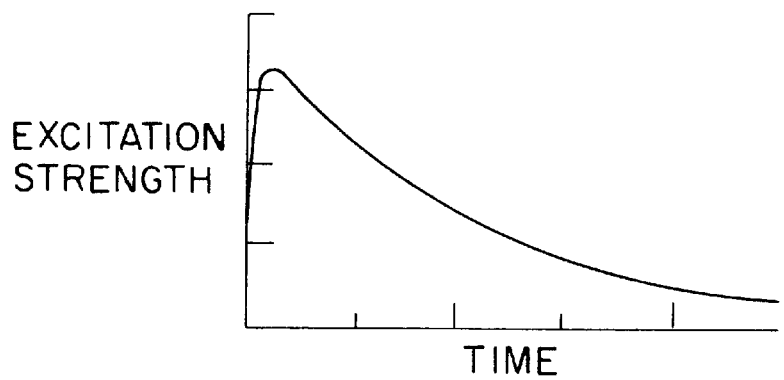
FIG. 17($a$) is a view typically showing a gain switch and shows the relationship between the time and the intensity of excitation.
Figure 17:
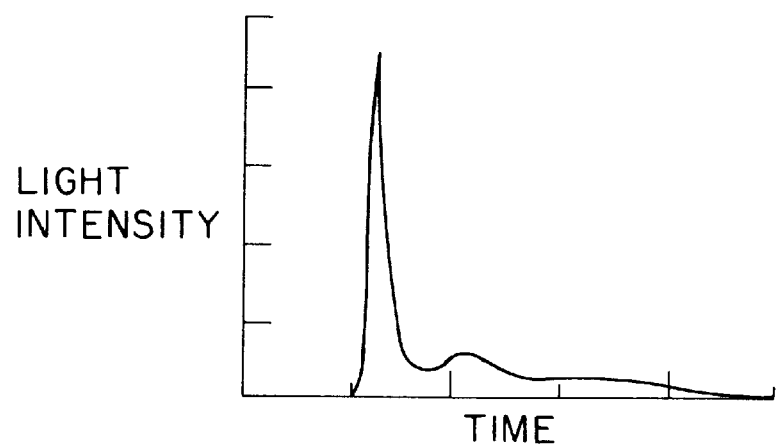
Figure 17:
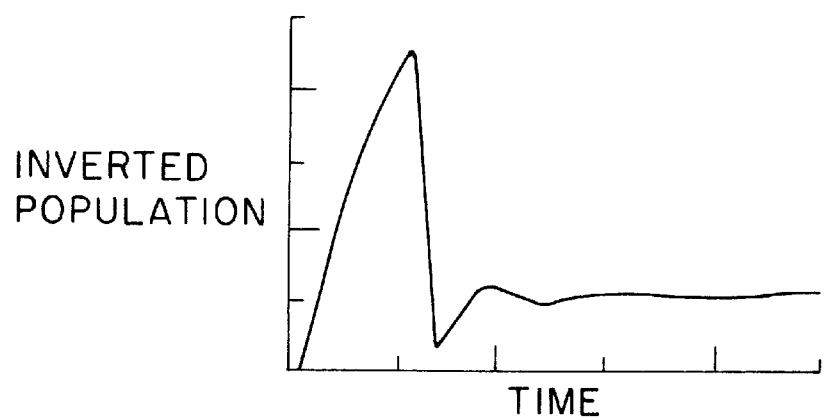

Further, FIGS. 17(a), 17(b) and 17(c) typically show gain switches, respectively, wherein FIG. 17(a) is a view showing the relationship between the time and the intensity of excitation, FIG. 17(b) is a view illustrating the relationship between the time and the intensity of light, and FIG. 17(c) is a view depicting the relationship between the time and the inverted population.

It can be understood from observations of these drawings that the maximum intensity of light is produced after the elapse of a predetermined excitation time.

Figure 18:
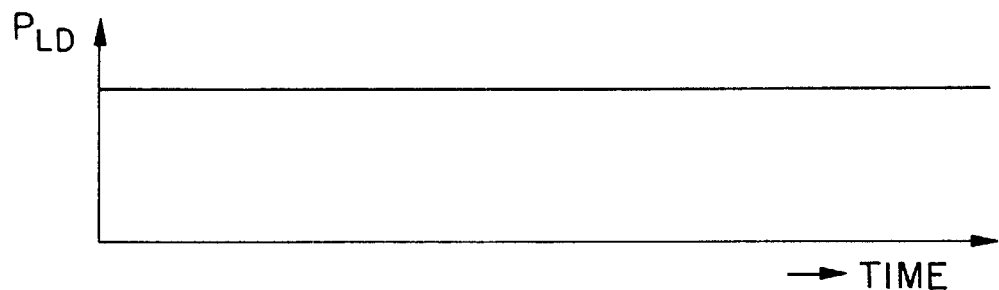
FIGS. 18($a$)–18($c$) are a views showing the relationship between inverted populations and the intensity of light.
Figure 18:
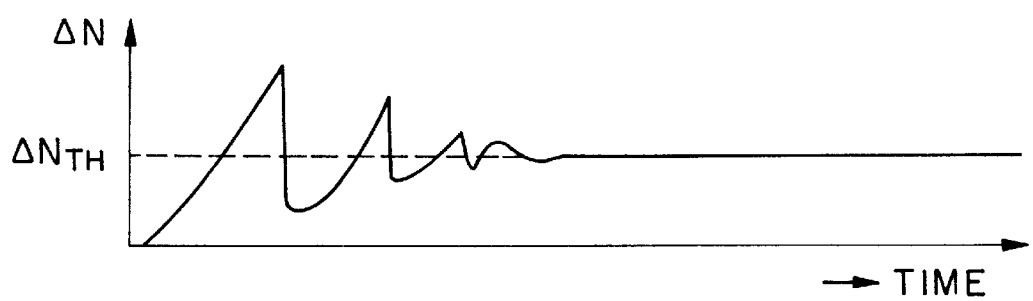
Figure 18:
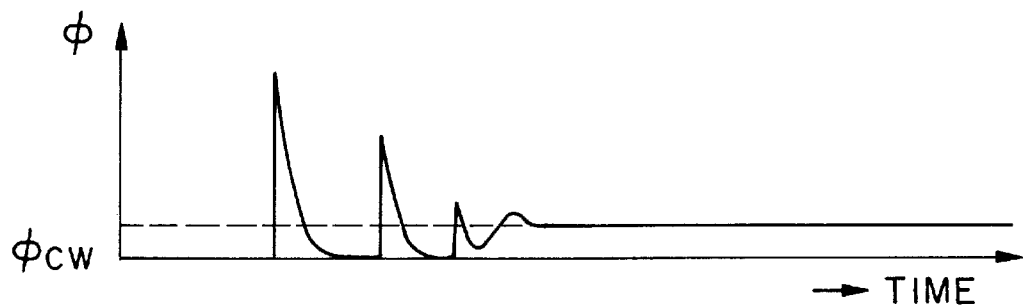

Next, the relationship between the inverted population and the light intensity is illustrated in FIG. 18 in separated form. If driving power expressed in a continuous wave is supplied to a semiconductor laser, then the maximum light intensity is produced in response to the first pulse. Thereafter, the light intensity is reduced so as to converge on a predetermined light intensity. Therefore, the use of the first pulse alone permits the most efficient extraction of light.

Referring further to FIGS. 19(a)–19(c) and 19(d)–19(f), a description will be made of the case in which driving power expressed in a continuous pulse is supplied to a semiconductor laser.

Figure 19A:
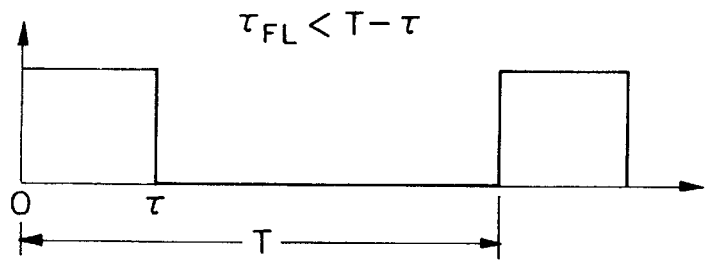
FIGS. 19(a)–19(c) are views for describing the relationship in which a period T of a continuous pulse supplied to a semiconductor laser satisfies the condition that $\tau_{FL}<T-\tau$.
Figure 19B:
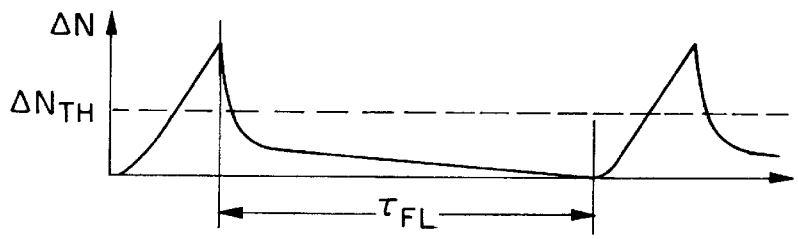
Figure 19C:
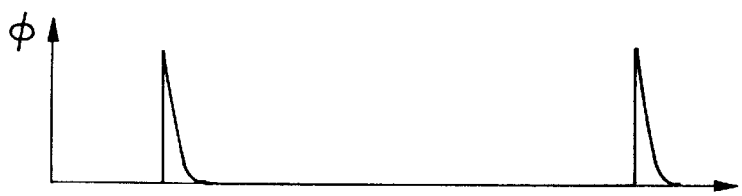

FIGS. 19(a)–19(c) views for describing the relationship in which a period T of the continuous train pulse supplied to the semiconductor laser satisfies the condition that $\tau_{FL}$<T−τ. In the present expression, $\tau_{FL}$ indicates the life of fluorescence, and τ indicates the width of the pulse.

In contrast to FIGS. 19(a)–19(c), FIGS. 19(d)–19(f) are views for describing the relationship in which the period T of the continuous pulse supplied to the semiconductor laser satisfies the condition that $\tau_{FL}$>T−τ.

Figure 19D:
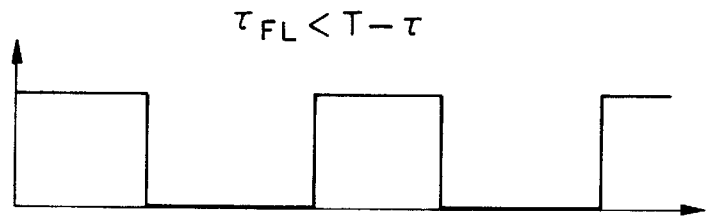
Figure 19E:
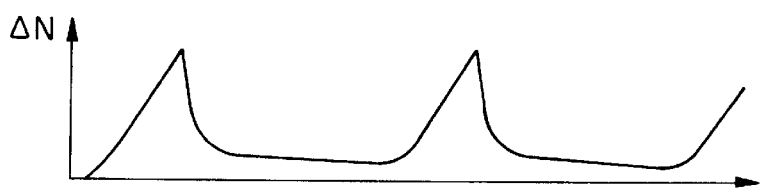
Figure 19F:
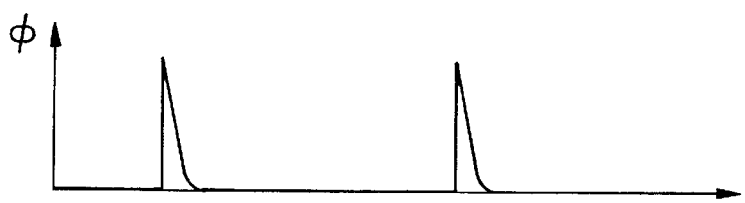

It can be understood from FIGS. 19(d)–19(f) that a new inverted population is added to the remaining inverted population by applying the next pulse to the semiconductor laser during $\tau_{FL}$ (life of fluorescence), whereby only light having the maximum light intensity can be effectively produced on a continual basis.

The relationship between the output of a semiconductor laser and the outputs thereof at the time that the non-linear optical medium 400 is inserted, will next be described with reference to FIGS. 20(a) through 20(d).

Figure 20A:
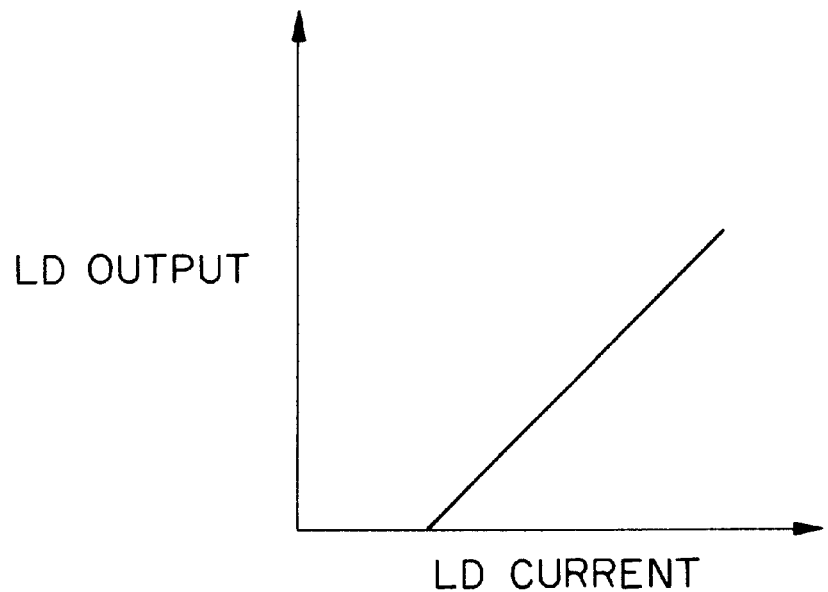
FIG. 20(a) is a view for describing the relationship between the current to be consumed by the semiconductor laser and the output of the semiconductor laser.

FIG. 20(a) is a view for describing the relationship between the current to be consumed by the semiconductor laser and the output of the semiconductor laser. The relationship therebetween is linear after the flow of an offset current.

Figure 20B:
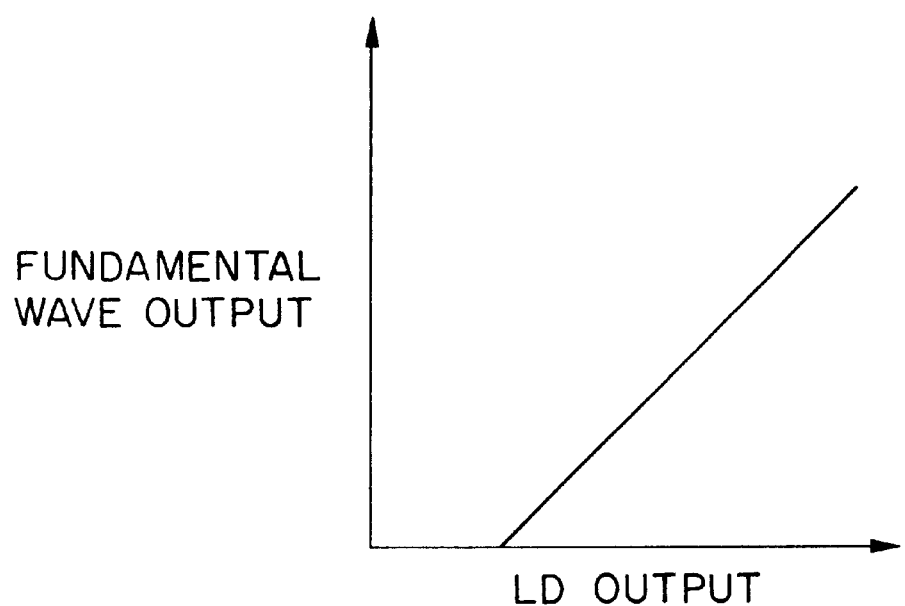
FIG. 20(b) is a view for describing the relationship between the output of the semiconductor laser and a fundamental wave output in an optical resonator.

FIG. 20(b) is a view for describing the relationship between the output of the semiconductor laser and the output of an optical fundamental wave in an optical resonator. The relationship therebetween is linear after the flow of the offset.

Figure 20C:
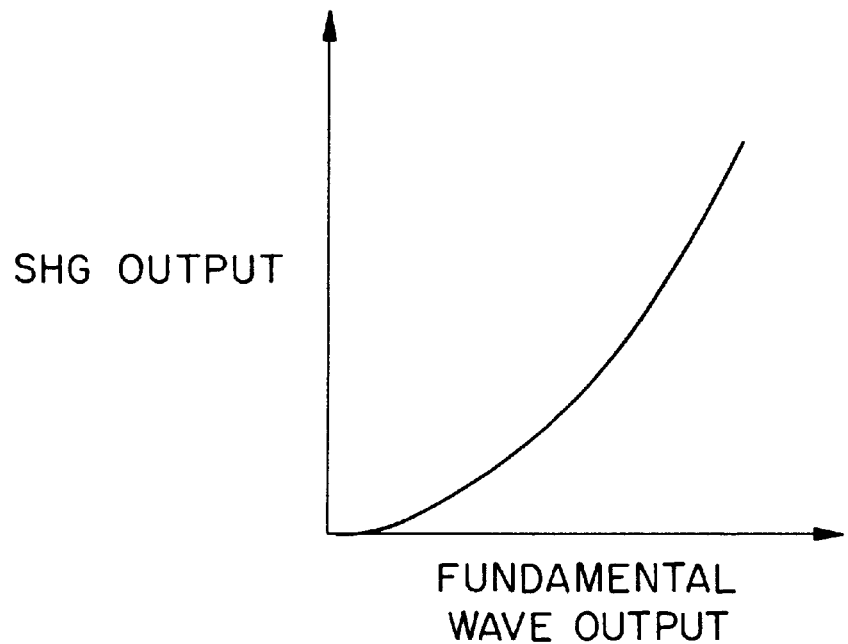
FIG. 20(c) is a view for describing the relationship between the fundamental wave output in the optical resonator and the second harmonic generation (SHG) output at the time the a non-linear optical medium 400 is inserted into the optic resonator.

FIG. 20(c) is a view for describing the relationship between the optical fundamental wave output in the optical resonator and a second harmonic generation (SHG) output at the time that the non-linear optical medium 400 is inserted into the optical resonator. It can be understood from FIG. 20(c) that the second harmonic generation (SHG) output is proportional to the square of the optical fundamental wave output in the optical resonator after an offset of the optical fundamental wave output.

Figure 20D:
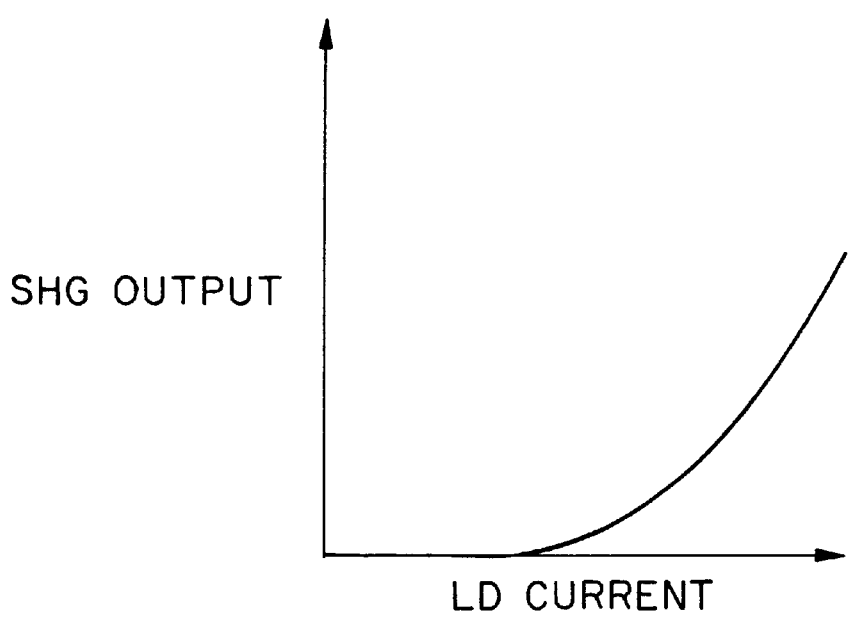
FIG. 20(d) is a view for describing the relationship between the current to be used up by the semiconductor laser and the second harmonic generation (SHG) output thereof.

Accordingly, the current to be used up by the semiconductor laser is proportional to the square of the second harmonic generation (SHG) output as shown in FIG. 20(d).

Thus, if the non-linear optical medium 400 is inserted into the optical resonator and laser driving means 600 drives the semiconductor laser serving as the laser light source 100 so that the next driving pulse is applied within $\tau_{FL}$ (life of fluorescence), then the semiconductor laser can be oscillated with high efficiency as shown in FIG. 21.

Namely, if the semiconductor laser corresponding to the laser light source 100 is driven in terms of a pulse width τ, a pulse peak current $I_p$, and a pulse period or cycle T, then a laser beam having a lightwave pulse peak output $P^P_{SH}$ of a lightwave pulse width τ' is generated.

The average current that flows in the semiconductor laser at this time, is $I_{av}$, and the average output of the lightwave pulse is $P^{av}_{SH}$.

When the laser driver 119 continuously drives the laser light source 100 (when a continuous output $P^{cw}_{SH}$ identical to an average pulse output $P^{av}_{SH}$ is produced), the magnitude of $I_{cw}$ is required as a continuous working current. Therefore, when the laser light source 100 is pulse-driven so as to generate a laser beam corresponding to an output identical to a continuous wave, a current of $I_{cw}-I_{av}$ can be saved.

The laser element or the laser-diode excited laser beam oscillating device 1000 has a characteristic stable to predetermined light emission when light-produced and driven after its relaxation oscillations subsequent to the emission of peak light. Therefore, if the laser beam oscillating device is pulse-driven using the characteristic, then its light-emission driving can be performed with less power consumption as compared with continuous light emission when visually-recognized light intensity is set in a manner similar to the continuous light emission.

Namely, if the pulse driving means is driven so that the period T of the driving pulse of the pulse driving means satisfies $\tau_{FL} > T-\tau$ with respect to $\tau_{FL}$ (life of fluorescence) as described in the paragraph of [Principle of Laser-Diode Excited Laser Beam Oscillating Device] referred to above, then the light-emission driving can be implemented with less power consumption.

Preferred embodiments of the present invention will hereinafter be described with reference to the accompanying drawings.

An example in which the above-described laser oscillating device 1000 is applied to a laser irradiating device, will next be described.

First Embodiment

Figure 5:
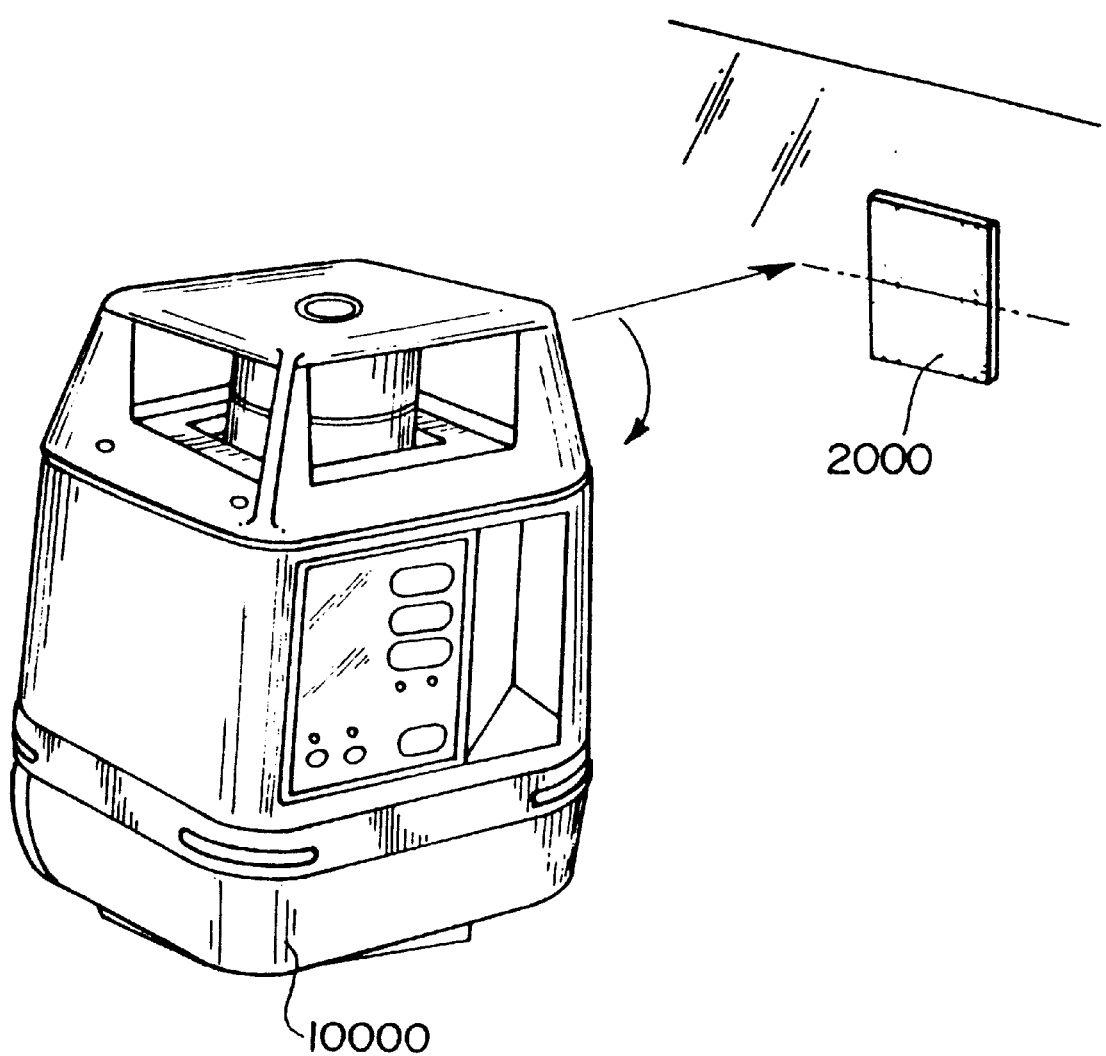
FIG. 5 is a perspective view showing a laser irradiating device according to a first embodiment of the present invention.

FIG. 5 is a perspective view showing a laser irradiating device 10000 and a target 2000.

An optical configuration and an electrical configuration of the laser irradiating device 10000 will be described.

Figure 6:
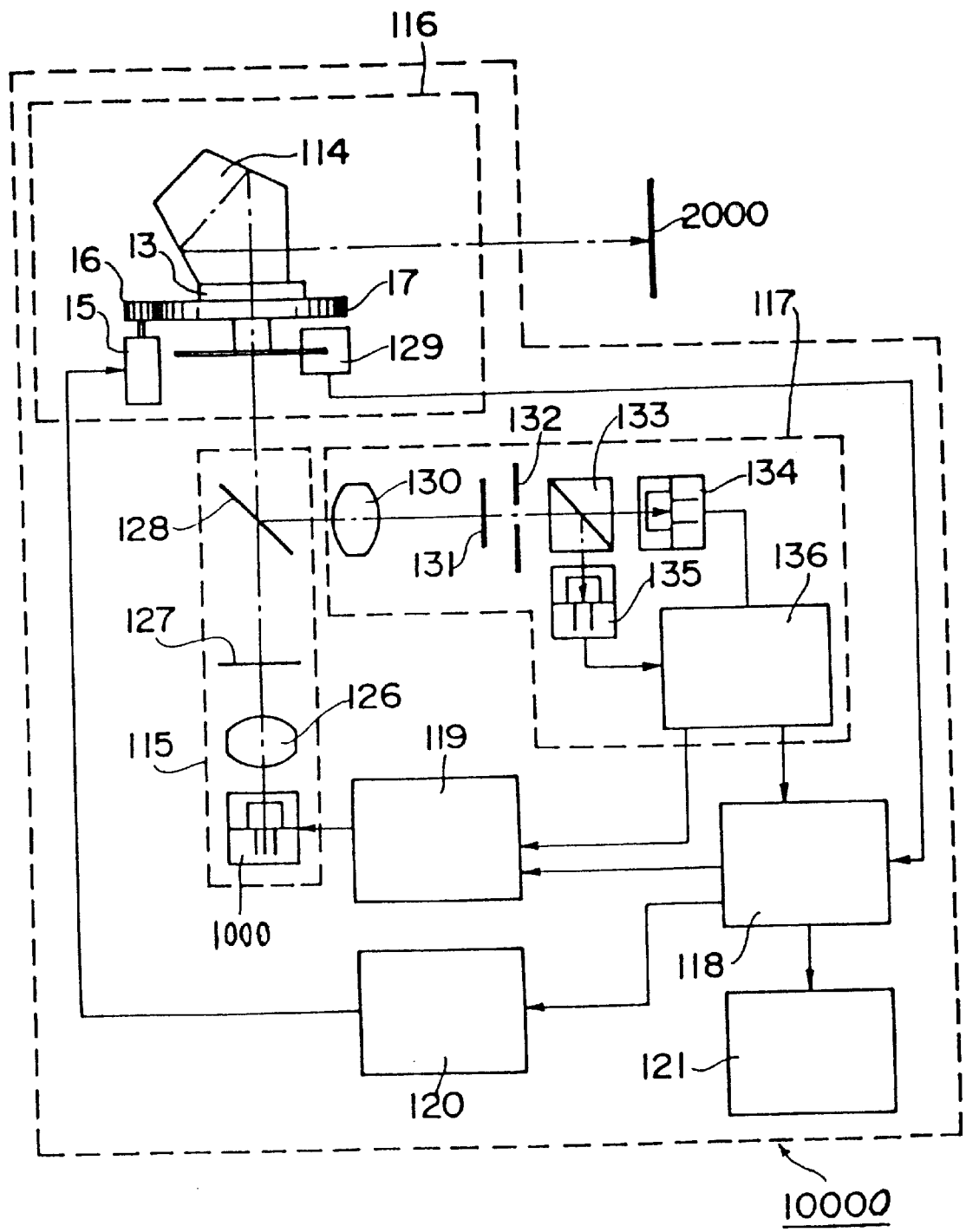
FIG. 6 is a view showing a configuration of the laser irradiating device shown in FIG. 5.

As shown in FIG. 6, the laser irradiating device 10000 comprises a light-emitting unit 115, a rotatable unit 116, a reflected light detecting unit 117, a control unit (CPU) 118, a laser driving unit 119, a motor drive unit 120 and a display 121.

The control unit (CPU) 118 corresponds to an arithmetic processing means.

The light-emitting unit 115 will now be explained.

A collimator lens 126, a first λ/4 double refractive member 127 and a perforated mirror 128 are successively disposed on an optical axis of the laser oscillating device 1000 for emitting a linearly polarized pencil or flux of irradiation light from the laser oscillating device 1000 side. The linearly polarized flux of irradiation light emitted from the laser oscillating device 1000 is made parallel light by the collimator lens 126, after which it is converted into circularly polarized light by the first λ/4 double refractive member 127. A circularly polarized flux of irradiation light passes through the perforated mirror 128 so as to be emitted to the rotatable unit 116.

The rotatable unit 116 deflects the optical axis of the polarized flux of irradiation light incident from the light-emitting unit 115 by 90 degrees and thereafter performs emission scanning. A pentaprism 114 for deflecting the optical axis of the polarized flux of irradiation light incident from the light-emitting unit 15 by 90 degrees is provided on a rotatable support 13 rotated about the optical axis of the polarized flux of irradiation light. A state of rotation of the rotatable support 13 is detected by an encoder 129 and the signal detected by the encoder 129 is inputted to the control unit 118.

A polarized flux of light reflected from the target 2000 falls on the rotatable unit 116. The polarized flux of reflected light incident on the pentaprism 114 is deflected toward the perforated mirror 128, which launches the polarized flux of reflected light into the reflected light detecting unit 117.

Figure 7:
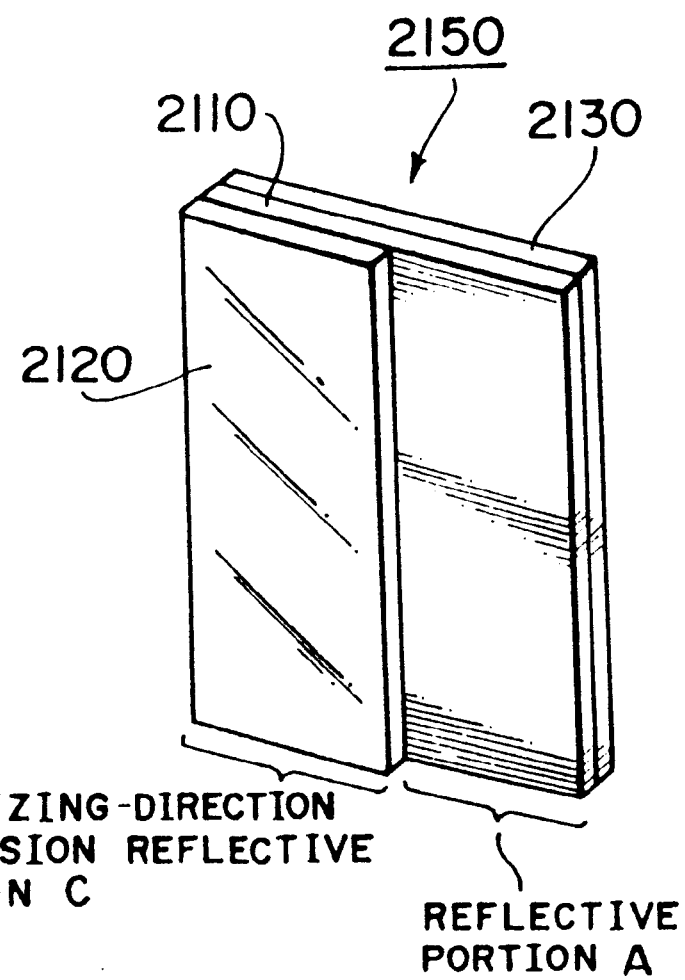
FIG. 7 is a view for describing a target.

A combination reflective member 2150 formed on the target 2000 will next be described with reference to FIG. 7.

The combination reflective member 2150 is constructed by stacking a retroreflective member 2110 on a substrate 2130 and bonding a λ/4 double refractive member 2120 to the left half thereof shown in the drawing. The combination reflective member 2150 comprises a reflective portion A at which the retroreflective member 2110 is rendered bare and which stores the polarizing direction of an incident light flux or pencil and reflects it, and a polarizing-direction conversion reflective portion C at which the retroreflective member 2110 is covered with the λ/4 double refractive member 2120 and which is used to effect polarizing-direction conversion on the incident light pencil and reflect it.

Figure 8A:
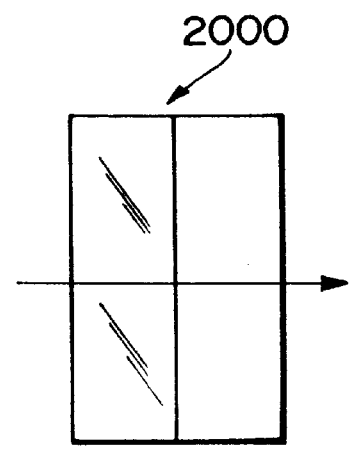
FIG. 8 is a view for describing an output produced from a second differential amplifier.
Figure 8B:
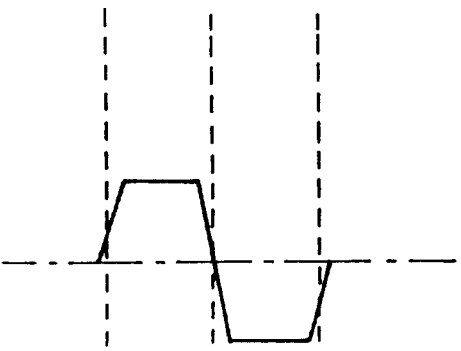

When the laser beam scans the combination reflective member 2150 of the target 2000 to select light reflected therefrom and the first photoelectric converter 134 and the second photoelectric converter 135 receive the reflected light therein, the output of the second differential amplifier 1369 is represented as shown in FIG. 8. Further, a predetermined positional relationship between the reflective portion A and the polarizing-direction conversion reflective portion C can be easily detected by detecting an inverted signal.

The reflected light detecting unit 117 will next be described.

A condenser lens 130, a second λ/4 double refractive member 131, a pinhole 132, a polarizing beam splitter 133 and the first photoelectric converter 134 are successively disposed on a reflecting optical axis of the perforated mirror 128 from the perforated mirror 128 side. Further, the second photoelectric converter 135 is disposed on a reflecting optical axis of the polarizing beam splitter 133. Outputs produced from the first photoelectric converter 134 and the second photoelectric converter 135 are inputted to a reflected light detecting circuit 136.

The polarized flux of light reflected by the target 2000 is deflected by 90 degrees by the pentaprism 114, followed by falling on the perforated mirror 128. The perforated mirror 128 reflects the reflected flux of light on the condenser lens 130. The condenser lens 130 allows the reflected flux of light to enter the second λ/4 double refractive member 131 as focused light. The polarized flux of reflected light returned as the circularly polarized light is converted into linearly polarized light by the second λ/4 double refractive member 131, followed by falling on the pinhole 132. Since the corresponding polarized flux of reflected light is λ/2 out of phase with the polarized flux of light reflected by the reflected portion A as described above, the two polarized fluxes of reflected light each converted into the linearly polarized light by the second λ/4 double refractive member 131 are different in plane of polarization by 90 degrees from each other.

The pinhole 132 has the function of avoiding the launching of an unwanted flux of reflected light whose optical axis is shifted from the polarized flux of irradiation light emitted from the main body, i.e., a light flux reflected from an unnecessary reflector other than the target 2000 into the first photoelectric converter 134 and the second photoelectric converter 135. The polarized flux of reflected light transmitted through the pinhole 132 enters the polarizing beam splitter 133.

The polarizing beam splitter 133 has the function of dividing the light pencil into intersecting polarized components. The polarizing beam splitter 133 transmits therethrough a polarized flux of reflected light (which is different in polarizing direction by 180 degrees from the polarized flux of irradiation light emitted from the laser oscillating device 1000) similar to the polarized flux of irradiation light emitted therefrom and reflects a polarized flux of reflected light different in polarizing direction by 90 degrees from the polarized flux of reflected light emitted from the laser oscillating device 1000. Further, the first photoelectric converter 134 and the second photoelectric converter 135 receive the divided polarized fluxes of reflected light therein respectively.

The states of light reception by the first and second photoelectric converters 134 and 135 will be described. Namely, when the polarized flux of light reflected by the polarizing-direction conversion reflective portion of the target 2000 falls on the reflected light detecting unit 117, the quantity of light launched into the first photoelectric converter 134 becomes greater than the quantity of light launched into the second photoelectric converter 135 from the relationship between the second λ/4 double refractive member 131 and the polarizing beam splitter 133. On the other hand, when the polarized flux of light reflected by the reflector or the undesired reflector of the target 2000 falls on the reflected light detecting unit 117, the quantity of light launched into the second photoelectric converter 135 becomes greater than the quantity of light launched into the first photoelectric converter 134.

Accordingly, the reflected light detecting circuit 136 can identify, based on the difference between the signals produced from the first and second photoelectric converters 134 and 135, whether the incident polarized flux of reflected light has been reflected from the reflective portion A of the target 2000 or from the polarizing-direction conversion reflective portion C.

Thus, the control unit 118 applies a laser beam in the target direction so as to perform control such as scanning or the like.

Second Embodiment

A laser irradiating device 20000 according to a second embodiment will next be described.

Figure 9:
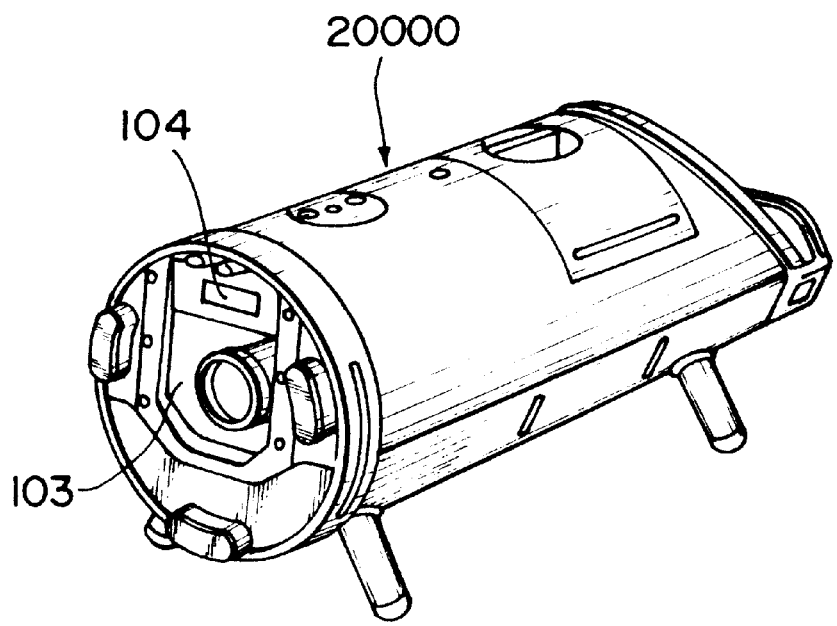
FIG. 9 is a perspective view showing a laser irradiating device according to a second embodiment of the present invention.
Figure 10:
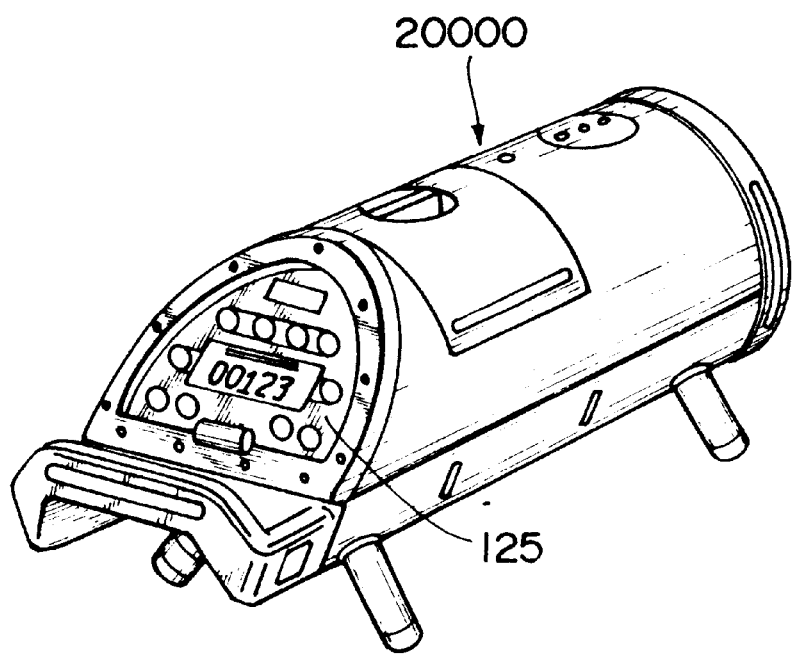
FIG. 10 is a perspective view illustrating the laser irradiating device shown in FIG. 9.

FIGS. 9 and 10 show the laser irradiating device 20000. Its body is shaped in the form of a cylinder and supported by four support legs. A laser oscillation system 1100 is mounted inside the cylindrical body of the laser irradiating device 20000 so as to be swingable in the two vertical and horizontal directions. The laser oscillation system 1100 is configured so that a laser beam emitted from the laser oscillating device 1000 can be applied in the horizontal and vertical directions.

A light projection window 103 covered with glass is defined in the entire surface of the body. The laser beam emitted from the laser oscillation system 1100 is applied through the light projection window 103.

A control panel 125 is provided on the opposite side of the light projection window 103 of the laser irradiating device 20000.

A light-receptive window 104 is defined in a portion above the light projection window 103. The light-receptive window 104 is configured so as to receive therethrough the laser beam reflected from a target 2000 and control signal light for remote control.

Figure 11:
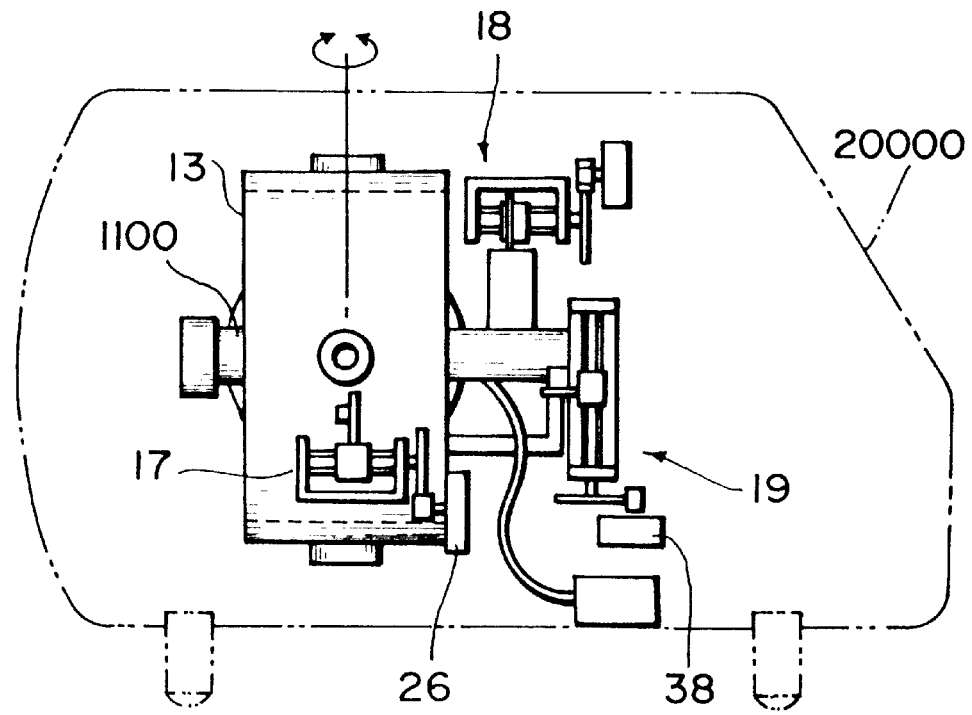
FIG. 11 is a view showing a configuration of the laser irradiating device shown in FIG. 9.
Figure 12:
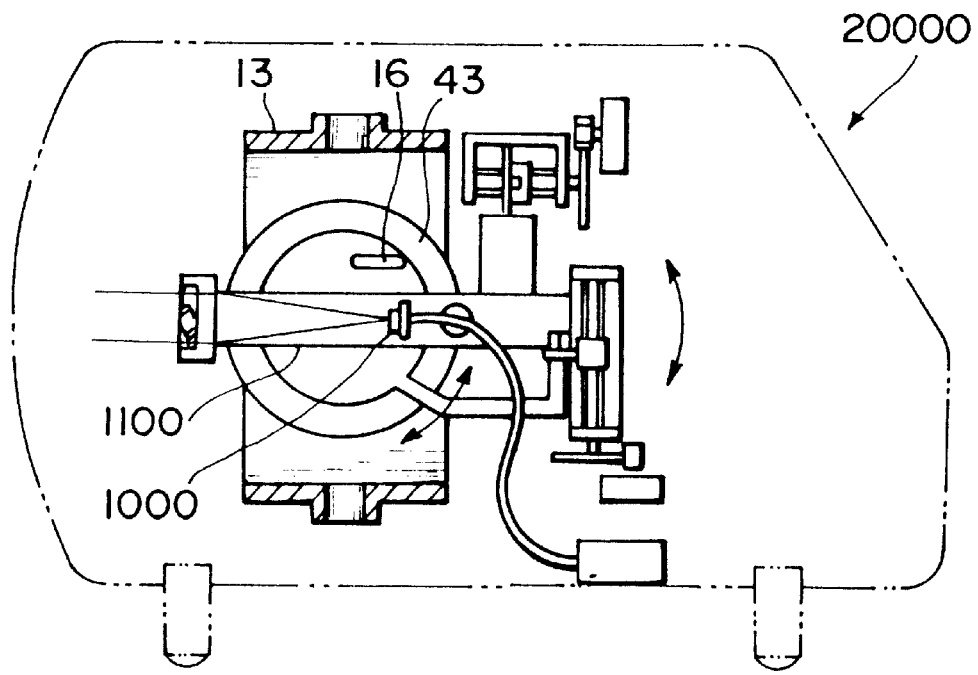
FIG. 12 a view depicting the configuration of the laser irradiating device shown in FIG. 9.

As shown in FIGS. 11 and 12, the laser oscillation system 1100 in the laser irradiating device 20000 is provided so as to be rotatable in the vertical and horizontal directions through an inclinable swing frame 13 provided within the body.

The laser oscillation system 1100 includes an encoder 43 for detecting the inclination of the laser oscillation system 1100 and a tilt sensor 16 for indicating a horizontal state thereof.

Further, the laser oscillating device 1000 is fixed to the body of the laser irradiating device 20000 and is constructed in such a manner that the laser beam emitted from the laser oscillating device 1000 is introduced into the laser oscillation system 1100 through a fiber and is applied from the laser oscillation system 1100.

The principal oscillation unit of the laser oscillating device is fixed to the body so as to allow heat radiation.

Figure 13:
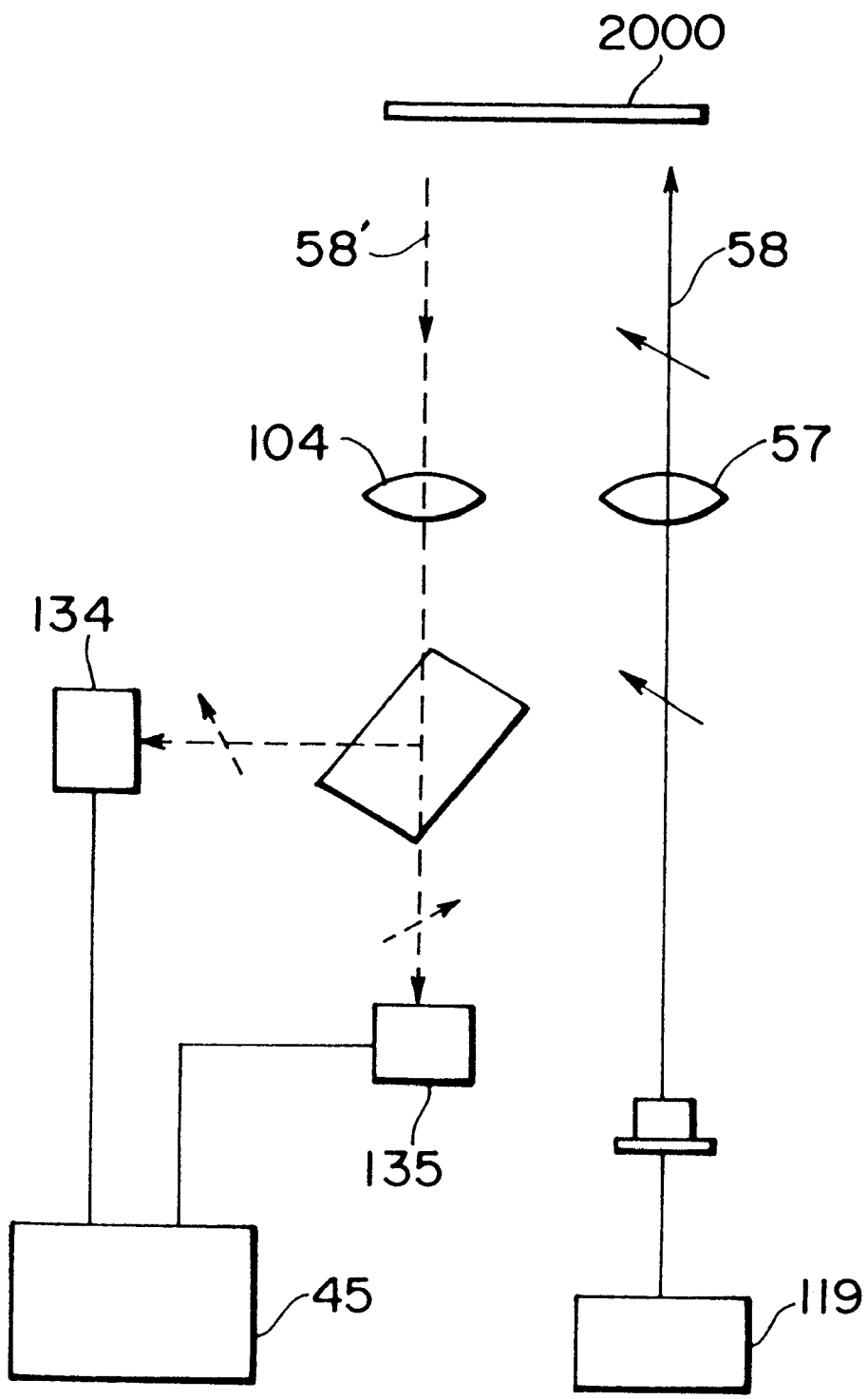
FIG. 13 is a view illustrating the configuration of the laser irradiating device shown in FIG. 9.

As shown in FIG. 13 corresponding to a control block diagram, a horizontal level controller 46 drives and controls a motor 26 of a horizontal angle control mechanism 17, for adjusting a horizontal angle. A vertical angle controller 47 drives and controls a motor 32 of a vertical angle control mechanism 18, for adjusting a vertical angle. A gradient controller 48 controls and drives a motor 38 of a tilt sensor tilting mechanism 19 for setting a gradient, in response to the output of the encoder 43 and a signal from a controller 45 based on the tilt sensor 16 in accordance with a setting unit 49.

Further, the horizontal level controller 46 and the vertical angle controller 47 drive the motor 26 and the motor 32 in response to the signal outputted from the controller 45 under the action of a reflected light detecting circuit 136 to thereby adjust the position of the target 2000.

Figure 14:
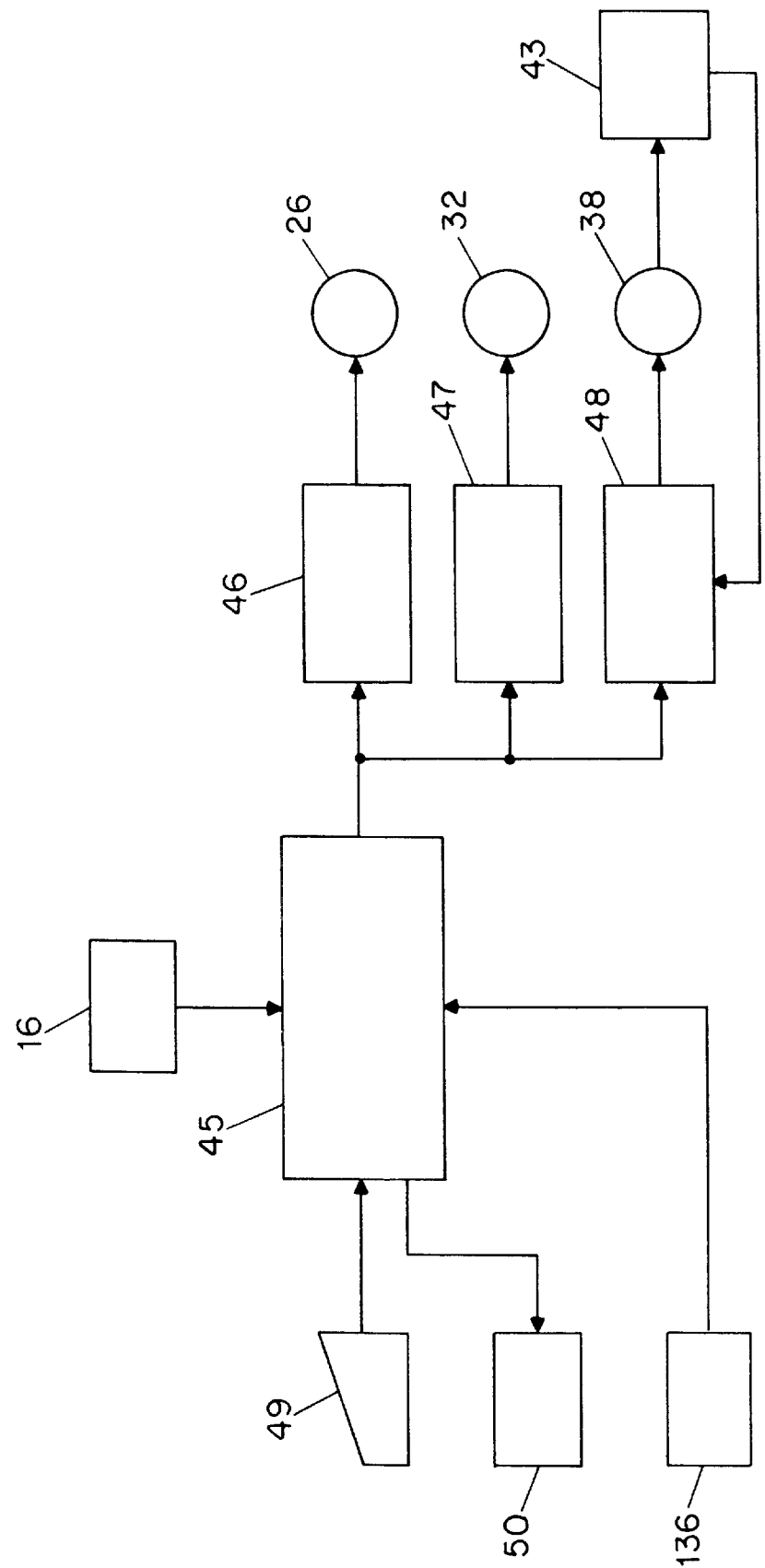
FIG. 14 is a view showing the configuration of the laser irradiating device shown in FIG. 9.

As shown in FIG. 14, a linearly polarized laser beam produced from the laser oscillation system 1100 is set to a parallel laser beam 58 by a collimator lens 57 so as to be applied to the target 2000 by the laser irradiating device 20000.

Light 58' reflected from the target 2000 enters the laser irradiating device 20000 and is selectively divided by a polarizing mirror 132 through a focusing lens 104, after which they are focused onto a first photoelectric converter 134 and a second photoelectric converter 135.

The reflected light 58' is reflected onto the first photoelectric converter 134 or transmitted toward the second photoelectric converter 135 by the polarizing mirror 132 according to the polarizing direction of the linearly polarized light.

The first photoelectric converter 134 and the second photoelectric converter 135 correspond to parts that constitute the reflected light detecting circuit 136. Light-intercepted signals detected by the reflected light detecting circuit 136 are sent to the controller 45.

In accordance with the states of light reception by the first photoelectric converter 134 and the second photoelectric converter 135, the controller 45 causes the horizontal level controller 46 to drive and control the motor 26 in response to the signal detected by the reflected light detecting circuit 136 and causes the vertical angle controller 47 to control and drive the motor 32 in response to the signal, thereby determining the direction to apply the laser beam 58 emitted from the laser oscillating device 1000 to the target 2000.

According to the present invention constructed as described above, an optical resonator is composed of at least a laser crystal and an output mirror. A laser light source pumps the optical resonator and a pulse driving means drives the laser light source. An irradiating means applies a pencil of pulse laser light produced from a laser oscillating device to a target device. A detecting means detects a light pencil reflected from the target device. An arithmetic processing means executes predetermined operations, based on the signal detected by the detecting means. Since the detecting means detects the reflected light pencil of the pulse laser light pencil in synchronism with a period T of a driving pulse of the pulse driving means, pulse driving for providing less power consumption can be utilized in place of a modulating signal as compared with continuous light emission and the reflected light can be detected simultaneously with power reduction. Thus, an advantageous effect can be brought about in that the need for the provision of a modulating device outside is eliminated so that the device according to the present invention can be simplified in terms of a mechanism.

Further, the present invention can bring about an advantageous effect in that externally-incoming noise light can be eliminated and signal light can be detected stably.

Moreover, the present invention can bright about an advantageous effect in that since the period T of the driving pulse of the pulse driving means can satisfy $\tau_{FL} > T-\tau$ with respect to $\tau_{FL}$ (life of fluorescence), the optical resonator can be pumped in accordance with a laser beam having light intensity maximized due to a first pulse, so that the laser beam can be generated with high efficiency.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A laser irradiation light detecting device comprising:

a laser oscillating device comprising:

a laser light source for generating a pencil of pulse laser light;

an optical resonator for resonating and amplifying said pencil of pulse laser light, said optical resonator comprising at least a laser crystal and an output mirror; and pulse driving means for generating a driving pulse for driving said laser light source;

means for irradiating a target device comprising rotating means for rotating said amplified pencil of pulse laser light;

means for detecting a light pencil reflected from said target device, said detecting means detecting said reflected light pencil in synchronism with a period T corresponding to said driving pulse of said pulse driving means; and arithmetic processing means for executing predetermined operations based on a signal detected by said detecting means.

2. The laser irradiation light detecting device according to claim 1, wherein said driving pulse has a pulse width $\tau$ with respect to a life of fluorescence $\tau_{FL}$ of said driving pulse such that the period T of said driving pulse is defined by a relationship $\tau_{FL} > T-\tau$.

3. The laser irradiation light detecting device according to claim 1, wherein said optical resonator comprises a non-linear optical medium inserted therein for generating a second harmonic.

4. The laser irradiation light detecting device according to claim 1, wherein said detecting means comprises means for detecting a fundamental component of a drive pulse frequency of said pulse driving means.

5. The laser irradiation light detecting device according to claim 1, wherein said detecting means samples values of a signal representative of said reflected light pencil at predetermined time intervals within said period T and integrates said sampled values over a plurality of cycles of said pencil of pulse laser light.

* * * * *